(12) United States Patent
Haynes

(10) Patent No.: US 9,233,585 B1
(45) Date of Patent: Jan. 12, 2016

(54) TOWING TIE ASSEMBLY

(71) Applicant: Tommy B. Haynes, Macksville, KS (US)

(72) Inventor: Tommy B. Haynes, Macksville, KS (US)

( * ) Notice: Subject to any disclaimer, the term of this patent is extended or adjusted under 35 U.S.C. 154(b) by 196 days.

(21) Appl. No.: 14/048,909

(22) Filed: Oct. 8, 2013

(51) Int. Cl.
*B60D 1/18* (2006.01)

(52) U.S. Cl.
CPC .......................................... *B60D 1/18* (2013.01)

(58) Field of Classification Search
CPC .......... B60D 1/18; B60D 1/187; B60D 1/249; B60D 1/182; B66C 1/12; B66C 1/18
USPC ........ 280/480, 483, 486; 294/82.11; 267/134, 267/138, 148, 73, 74; 28/140, 143
See application file for complete search history.

(56) References Cited

U.S. PATENT DOCUMENTS

| | | | |
|---|---|---|---|
| 478,076 A | 7/1892 | Asten | |
| 1,599,353 A | 9/1926 | Albin | |
| 1,672,074 A * | 6/1928 | Mordt | 24/128 |
| 1,695,595 A * | 12/1928 | Larned | 428/591 |
| 1,859,204 A * | 5/1932 | Gray | 28/143 |
| 1,962,585 A * | 6/1934 | Faure-Roux | 267/74 |
| 3,079,192 A * | 2/1963 | Otley | 294/74 |
| 3,978,894 A | 9/1976 | Boone | |
| 4,240,659 A | 12/1980 | St. Germain | |
| 4,446,653 A | 5/1984 | Morgan, Jr. | |
| 4,745,883 A | 5/1988 | Baggetta | |
| 4,975,543 A | 12/1990 | Saunders | |
| 5,062,085 A | 10/1991 | Andrews, Jr. | |
| 5,113,981 A | 5/1992 | Lantz | |
| 5,308,101 A | 5/1994 | Monty | |
| 5,561,973 A * | 10/1996 | St. Germain | 57/22 |
| 5,564,476 A | 10/1996 | Golz | |
| 6,085,802 A | 7/2000 | Silberberg | |
| 6,331,024 B1 | 12/2001 | Gulley | |
| 7,306,253 B2 | 12/2007 | Markley | |
| D597,788 S | 8/2009 | Ellis | |
| 7,726,350 B2 | 6/2010 | Jennings et al. | |
| 7,805,816 B1 | 10/2010 | Thorne, III et al. | |
| 8,387,750 B2 | 3/2013 | Russell et al. | |
| 2009/0054982 A1* | 2/2009 | Cimino | 623/13.19 |
| 2009/0194970 A1* | 8/2009 | Yeh et al. | 280/483 |
| 2011/0068021 A1 | 3/2011 | Tuchman | |
| 2012/0191133 A1* | 7/2012 | Ferree | 606/228 |

FOREIGN PATENT DOCUMENTS

JP    H07246909    3/1994

OTHER PUBLICATIONS

"A Paracord Man Project: Sinnett Knife Lanyard with Clip" published online by Zack on May 21, 2012 via http://aparacordmanproject.blogspot.com/2012/05/sinnett-knife-lanyard-with-clip.html retrieved from the internet on Jun. 15, 2015.*

* cited by examiner

*Primary Examiner* — Joseph Rocca
*Assistant Examiner* — Conan Duda
(74) *Attorney, Agent, or Firm* — Kenneth H. Jack; Davis & Jack, L.L.C.

(57) ABSTRACT

A towing tie assembly including a link having longitudinal and oppositely longitudinal ends and incorporating four pleated straps, each pleated strap forming longitudinally extending series of "C" bends, each "C" bend having a stem section and a pair of arm sections, each "C" bend's stem and arm sections defining a capture space, and each longitudinally extending "C" bend series forming a series of adjacent arm pairs with each "C" bend formed arm capture space receiving one of the adjacent arm pairs; the towing tie assembly further having fastening loops connected operatively to the link's longitudinal and oppositely longitudinal ends.

3 Claims, 5 Drawing Sheets ically, this invention relates to adapta-

TOWING TIE ASSEMBLY

FIELD OF THE INVENTION

This invention relates to tow ropes, tow straps, tow chains, and the like which are adapted for pulling and towing of heavy vehicles. More particularly, this invention relates to adaptations of such towing implements which are adapted for reducing tendencies for explosive releases of elastic spring energy and for damping shock waves.

BACKGROUND OF THE INVENTION

Common heavy vehicle towing implements or ties, such as heavy chains, straps, cable, straps, and ropes typically acquires, upon application of a large tensioning force, a large amount of induced elastic or spring potential energy. In the event of unexpected breakage of such common towing ties, such induced elastic potential energy commonly instantaneously and explosively releases, undesirably producing an injurious backlash or whipping motions of the broken and disjointed ends of the tie. Such common towing ties also readily transmit forceful shock waves along their lengths without damping, allowing or causing such waves to prematurely break such ties.

The instant inventive towing tie assembly solves or ameliorates the towing tie drawbacks, defects and deficiencies noted above by specially configuring a link component of the assembly to include a pleated and interwoven configuration of a plurality of durable and flexible straps.

BRIEF SUMMARY OF THE INVENTION

A first structural component of the instant inventive towing tie assembly comprises a link portion having longitudinal and oppositely longitudinal ends. In the preferred embodiment, the link portion comprises a pleated and interwoven array or braid of a plurality of flexible straps, such plurality preferably comprising first, second, third, and fourth pleated straps. While the scope of the invention includes provision of a triple of pleated straps (producing a triangular cross-sectional link shape) or five pleated straps (producing a pentagonal cross-sectional shape) provision and incorporation of four pleated straps is preferred because the resultant square box configuration of a four strap braid is consonant with the flattened geometry of the invention's flexible straps and because such box configuration is easily and compactly packed, stacked, shipped, and stored.

By square braiding of the preferred quadruple of flexible straps in accordance with the instant invention, such straps form longitudinally extending series of "C" bends wherein each "C" bend among the series advantageously comprises a pair of arm sections and a stem interconnecting proximal ends of the arm sections, and wherein such stems and arms form series of "C" throats or arm capturing spaces.

Each longitudinally extending "C" bend series included within the preferred configuration of the link component of the instant invention is formed and arranged to create series of longitudinally abutting or adjacent arm pairs, such arm pairs being interwoven with respect to the "C" bends so that each capture space formed by one of the link's pleated straps receives one of the adjacent arm pairs formed by another of the link's pleated straps.

The instant inventive towing tie assembly preferably further comprises fastening means which are securely and fixedly attached to the link's longitudinal and oppositely longitudinal ends. In a preferred embodiment, the fastening means comprise eye bolt assemblies having threaded nuts and washers enmeshed within the link's back folded array of "C" bend arms. In the preferred embodiment, such fastening means are adapted for securely clamping against the link's longitudinal-most and oppositely longitudinal-most "C" bend arms. Where such preferred fastening means are provided, dual functions of prevention of unbraiding of the link's ends and secure tie connections are advantageously performed.

In use of the instant inventive towing tie assembly, and assuming that a heavy vehicle such as, for example, an agricultural combine is to be towed, the fastening component associated with the link's oppositely longitudinal end may be securely attached to the combine's tow hitch. Thereafter, the link's longitudinal fastener may be attached to a tow chain which may in turn be attached to a tractor. Upon application by such tractor of a towing force to the combine via the chain and the link, the link initially flexibly stretches to an elastic limit and thereafter functions substantially equivalently with the tow chain. In the event that forceful shock waves travel along the chain, such waves are damped by the inventive link, advantageously preventing such waves from fracturing the tow chain. Provided that, as is preferred, a link having a tensile strength less than that of the chain is provided, and in the event of accidental breakage during towing, the inventive link slowly releases its stored elastic potential energy and advantageously reduces dangerous and injurious backlash and whipping of the chain.

Accordingly, objects of the instant invention include the provision of a towing tie assembly which incorporates structures as described above, and which arranges those structures in manners described above for the achievement of the functions, objects, and benefits, as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
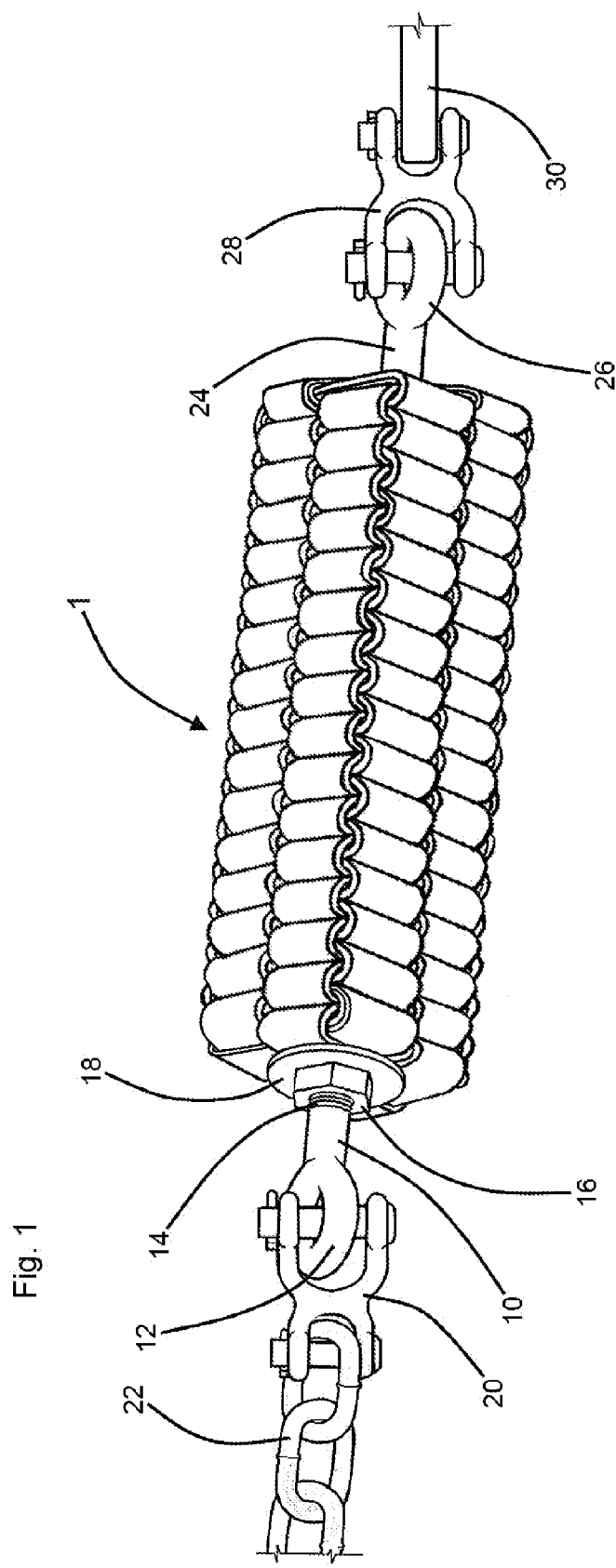
FIG. 1 is a perspective view of preferred embodiment of the instant inventive towing tie assembly.
Figure 2:
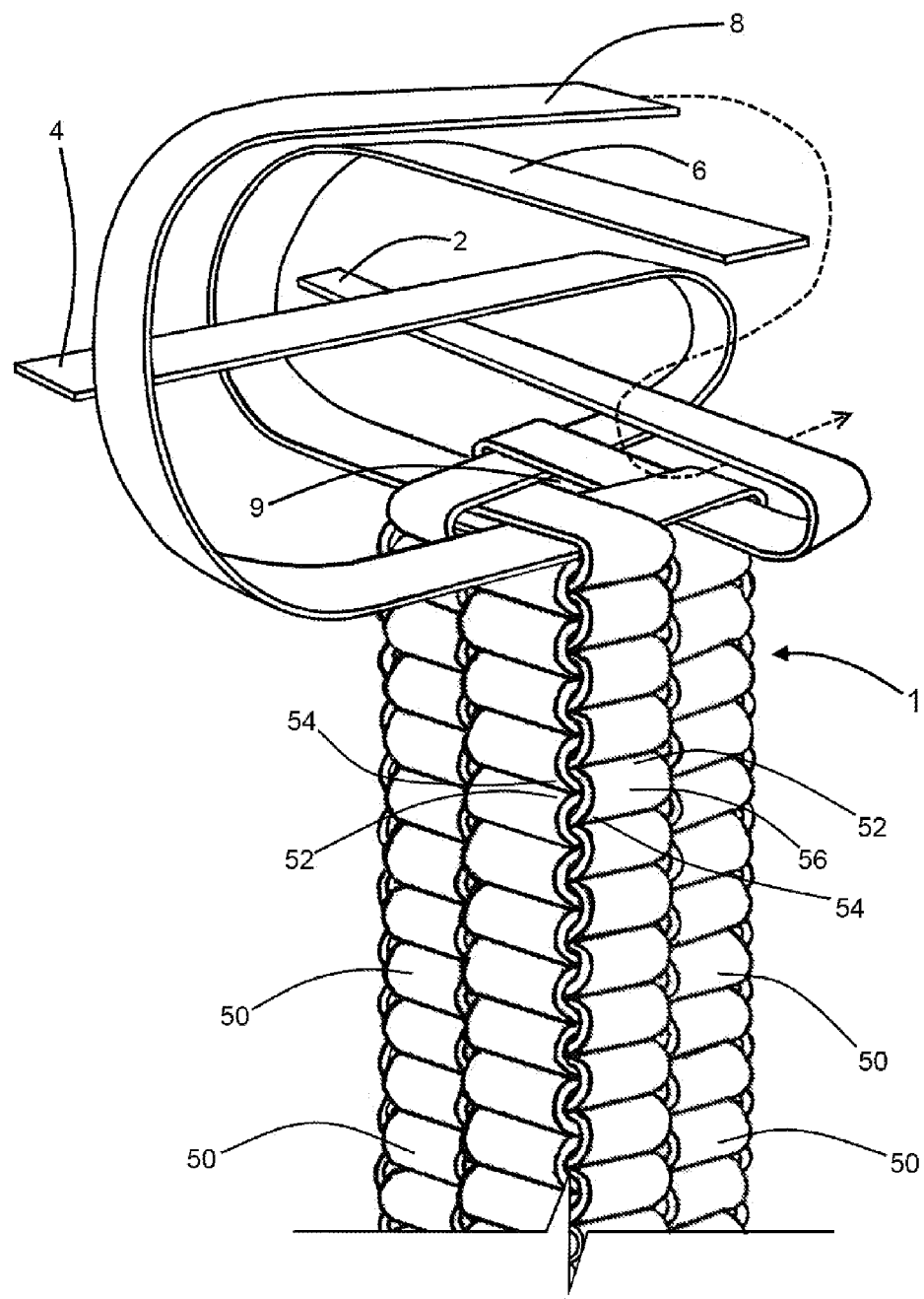
FIG. 2 presents a partial view of the instant inventive towing tie assembly during its fabrication process, the view demonstrating square braid weaving steps.

Referring now to the drawings, and in particular to Drawing FIGS. 1 and 2, a link component of the instant inventive towing tie assembly is referred to generally by Reference Arrow 1. The link component 1 has longitudinal and oppositely longitudinal ends which correspond with leftward and rightward ends according to the view of FIG. 1. The link component 1 preferably comprises a square braided configuration of four (4) flexible straps 2, 4, 6, and 8, each such flexible strap preferably being composed of durable woven nylon fiber. FIG. 2 depicts a square braiding or sequential series of back-folds which advantageously pleats each of the straps 2, 4, 6, and 8 into the depicted continuous "S" curve configuration. Following clockwise (according to view) successive folds of straps 2, 4, 6, and 8, with strap 8 tucked beneath strap 2, such folding steps may be sequentially repeated until the link 1 is sufficiently long.

The preferred pleated or "S" curved configuration of the link 1 advantageously causes each of the flexible straps 2, 4, 6, and 8 to form and present a pair of longitudinally extending series of "C" bends 50, each "C" bend 50 within such series comprising a pair of arm sections 52 and 54, and a stem section 56 spanning between and interconnecting proximal ends of such arm sections. Following the successive folding sequences represented by FIG. 2, series of "C" bend throats or arm capture spaces which are formed, such spaces being defined by the arms 52 and 54 and stem 56 combinations of the "C" bends 50. The arm capture spaces formed by the "C" bends of each strap among straps 2, 4, 6, and 8 advantageously receive and retain series of adjacent or abutting arm pairs 52,54 which are formed by two of the other straps. The orthogonal or perpendicular orientation of the openings of the "C" bend arm capture spaces with respect to the distal extensions of the arms which are bound and contained within such capture spaces advantageously forms the depicted box configuration of the link component 1. Such box configuration is advantageously compact and is easily stored and shipable within storage boxes. Such box configuration is also preferred because, upon the successive weaving and back folding the straps 2, 4, 6, and 8, in the manner depicted in FIG. 2, a hollow channel 9 is formed, such channel extending centrally and axially through the link 1 and opening at the link's longitudinal and oppositely longitudinal ends.

Referring to FIG. 1, the instant inventive towing tie assembly preferably further comprises fastening means which are connected operatively to the longitudinal and oppositely longitudinal ends of the link 1. Preferably, the fastening means are securely fixedly attached to the longitudinal and oppositely longitudinal ends of the link 1, and are capable of transferring pulling forces from, for example, a tow chain 22 to, for example, a vehicle's tow hitch 30. While the fastening means may suitably comprise loops of chain, strapping or cable (not depicted within views) which are interwoven into and bound at the longitudinal and oppositely longitudinal ends of the link 1, the helically threaded bolt configured fasteners depicted in FIGS. 1 and 3-5 are preferred. Such preferred fastening means comprise combinations of helically threaded bolts 10 and 24, nuts 16,17, and washers 18,19.

Figure 3:
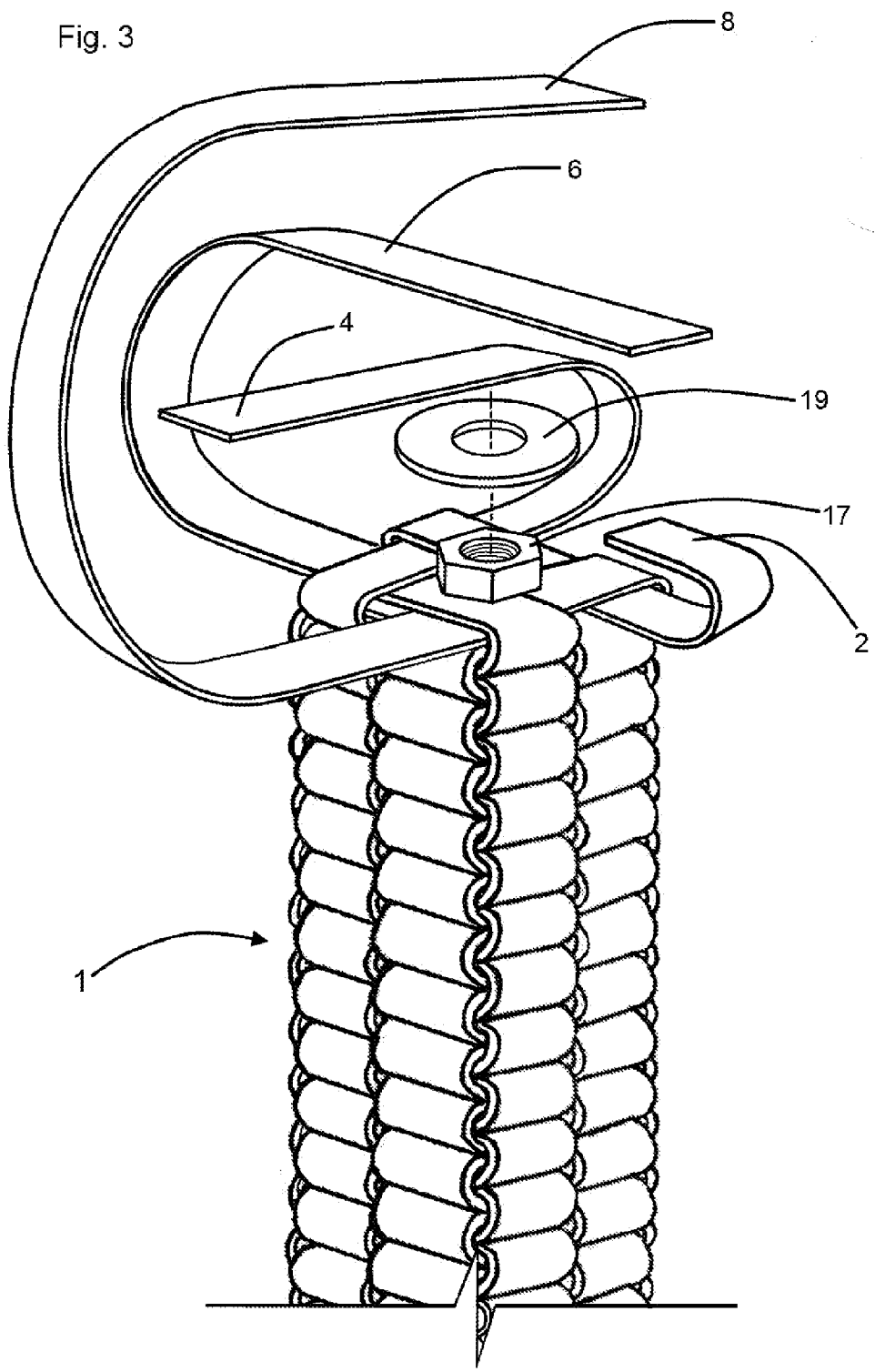
FIG. 3 redepicts the structure of FIG. 2, the view of FIG. 3 showing further fabrication steps of washer and threaded nut enmeshing.
Figure 4:
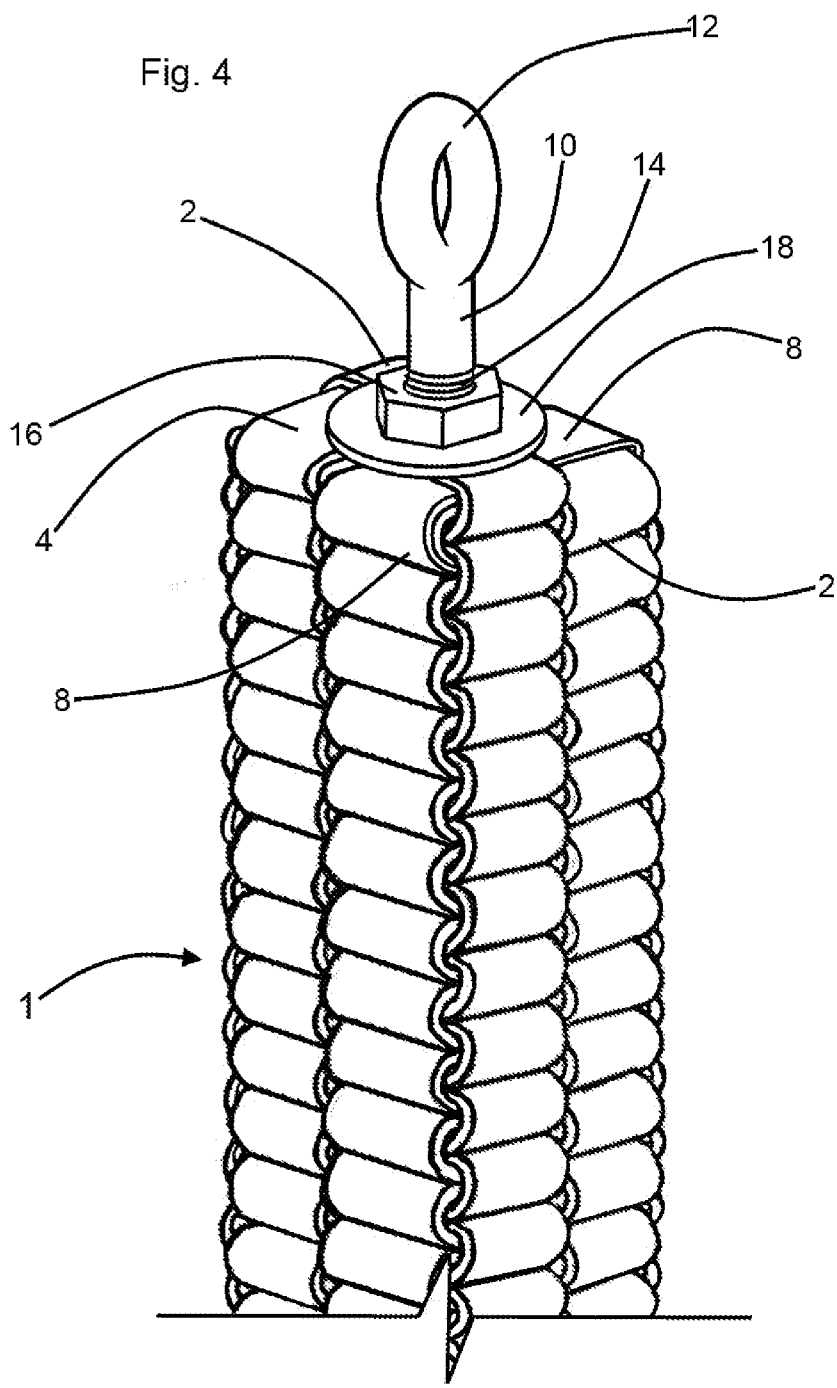
FIG. 4 presents an alternative partial perspective view of a finally fabricated configuration of the instant inventive assembly.

Referring simultaneously to FIGS. 2 and 3, in mounting and securing such preferred fastening means at the longitudinal end of the link 1, a helically threaded nut 17 may directly overlie and be placed upon the link's temporarily upwardly exposed "C" bend arms, and may be aligned with axial channel 9. Thereafter, a washer 19 may be directly placed over the nut 17, and the above described square braided weaving of the straps 2, 4, 6, and 8 may proceed either one or two additional sequences. Such final link braiding steps advantageously enmesh the nut 17 and the washer 19 within and amongst the link's back folded "C" bend arms. Thereafter, as is further depicted in FIG. 4, the oppositely longitudinal end of an eye bolt 10 (such bolt preferably having helical threads 14, and having a nut 16 and washer 18 preliminarily installed) may be inserted oppositely longitudinally into and through the longitudinal opening of axial channel 9. Continued extension of such bolt 10 passes its oppositely longitudinal end through the central opening of the enmeshed washer 19 for threaded engagement with the enmeshed nut 17. Thereafter, upon wrench actuated turning of the outer longitudinal nut 16, such nut advantageously threadedly moves along oppositely longitudinally along bolt 10 to securely compress and clamp against the enmeshing "C" bend arms at the longitudinal end of the link 1, such compression being localized between and against washers 19 and 18. Such clamping action applied to the "C" bend arms residing between washers 18 and 19 securely and fixedly mounts the bolt 10 and its eye loop 12 at the longitudinal end of the tow link 1. As depicted in FIG. 4, terminal ends of the straps 2, 4, 6, and 8 may be tucked between successive "C" bends, and may be adhesively secured, in order to finish the assembly.

The bolt 24 and eye loop 26 mounted at the oppositely longitudinal end of the link 1 are preferably mounted similarly with bolt 10 and loop 12.

Figure 5:
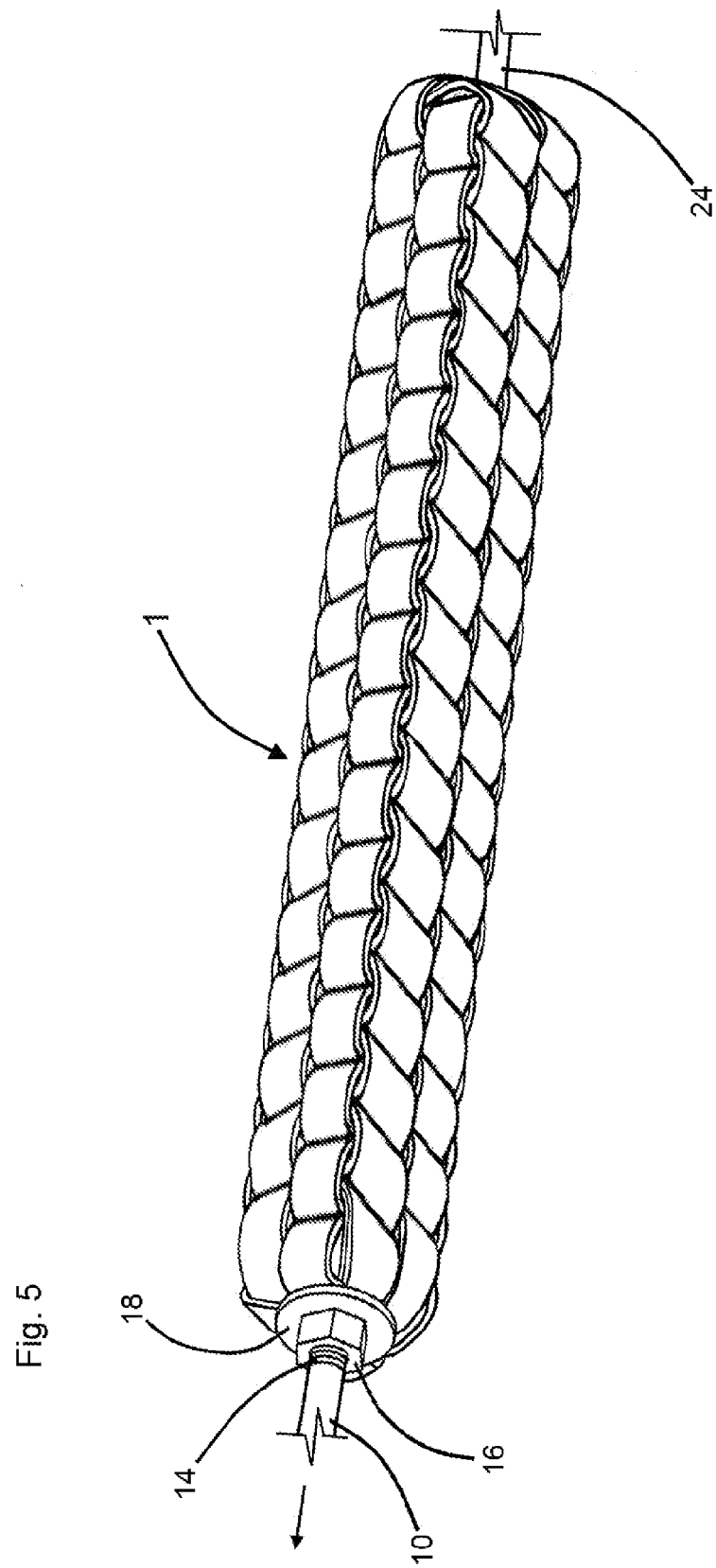
FIG. 5 presents a partial alternative view of the instant inventive assembly, the view showing the assembly's square braided link component in a tensioned configuration and during use.

In use of the instant inventive towing tie assembly, and referring in particular to FIG. 1, the oppositely longitudinal eye loop 26 may be securely attached by means of a clevis bracket 28 to a tow hitch 30 of a heavy vehicle in need of towing. Thereafter, the assembly's longitudinal bolt 10 and eye loop 12 may be similarly attached to a tractor's tow chain 22 by means of a second clevis bracket 20. Referring further simultaneously to FIG. 5, upon application of a towing force in the direction of the arrow drawn upon FIG. 5, such towing force is translated from the chain 22 to the hitch 30 through the link 1, such towing force stretching the link 1 from the compact pre-use configuration depicted in FIG. 1 to the stretched and extended use configuration depicted in FIG. 5. The instant invention's service and function as a towing tie link in the FIG. 5 configuration damps destructive shock waves which may travel along chain 22, advantageously protecting such chain from breakage. In the event of an accidental breakage localized within the link 1, accumulated elastic potential energy is slowly rather than explosively released, advantageously reducing backlash or whipping of the chain 22. In the event that the tensile strength of the link exceeds that of the chain, dual links installed at each end of the chain may be provided for reduction of backlash upon chain breakage.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A towing tie assembly comprising:
   (a) a link having longitudinal and oppositely longitudinal ends, the link comprising an axial channel having longitudinal and oppositely longitudinal openings, said openings being respectively positioned at the link's longitudinal and oppositely longitudinal ends, and comprising a plurality of pleated straps comprising a first, a second, a third, and a fourth strap, each pleated strap among the plurality of pleated straps comprising woven nylon fiber and forming a pair of "C" bend series, each "C" bend among the pairs of "C" bend series comprising a pair of arms, a stem spanning between the pair of arms, and a capture space bounded by the pair of arms and the stem, each of the "C" bend series comprising an adjacent arm pair series each of whose adjacent arm pairs is received within one of the capture spaces; and
   (b) fastening means comprising helically threaded fasteners comprising a longitudinal threaded bolt and an oppositely longitudinal threaded bolt, the longitudinal and oppositely longitudinal threaded bolts being respectively received within the axial channel's longitudinal and oppositely longitudinal openings, the fastening means being connected operatively to the link's longitudinal and oppositely longitudinal ends, wherein each adjacent arm pair among the adjacent arm pair series has a distal extension, wherein each "C" bend's capture space receives one of the adjacent arm pairs, and wherein said each "C" bend's capture space opens substantially perpendicularly with respect to said one adjacent arm pair's distal extension, the helically threaded fasteners further comprising a longitudinal inner nut and washer combination and an oppositely longitudinal inner nut and washer combination, the longitudinal and oppositely longitudinal inner nut and washer combinations being aligned with the axial channel, being enmeshed by the link's "C" bend arms, and being respectively mounted over the longitudinal and oppositely longitudinal helically threaded bolts.

2. The towing tie assembly of claim 1 wherein the helically threaded fasteners further comprise a longitudinal outer nut and washer combination and an oppositely longitudinal outer nut and washer combination, the longitudinal and oppositely longitudinal outer nut and washer combinations being respectively mounted over the longitudinal and oppositely longitudinal helically threaded bolts for, upon turnings of the nuts, compressively clamping the enmeshing "C" bend arms.

3. The towing tie assembly of claim 1 wherein the helically threaded fasteners further comprise longitudinal and oppositely longitudinal loops respectively fixedly attached to the longitudinal and oppositely longitudinal helically threaded bolts.

\* \* \* \* \*